(12) United States Patent
Guo et al.

(10) Patent No.: US 10,078,177 B2
(45) Date of Patent: Sep. 18, 2018

(54) BACKLIGHT MODULE AND DISPLAY DEVICE

(71) Applicant: Shenzhen China Star Optoelectronics Technology Co., Ltd., Shenzhen, Guangdong (CN)

(72) Inventors: Qing Guo, Guangdong (CN); Mei Han, Guangdong (CN); Yan Cheng, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 159 days.

(21) Appl. No.: 15/109,392

(22) PCT Filed: May 25, 2016

(86) PCT No.: PCT/CN2016/083288
§ 371 (c)(1),
(2) Date: Jun. 30, 2016

(87) PCT Pub. No.: WO2017/193419
PCT Pub. Date: Nov. 16, 2017

(65) Prior Publication Data
US 2018/0106957 A1 Apr. 19, 2018

(30) Foreign Application Priority Data
May 10, 2016 (CN) .......................... 2016 1 0304390

(51) Int. Cl.
*F21V 8/00* (2006.01)
*G02F 1/1335* (2006.01)

(52) U.S. Cl.
CPC .......... *G02B 6/0088* (2013.01); *G02B 6/005* (2013.01); *G02B 6/0055* (2013.01);
(Continued)

(58) Field of Classification Search
CPC .... G02B 6/0088; G02B 6/005; G02B 6/0055; G02B 6/0073; G02B 6/0091;
(Continued)

(56) References Cited

U.S. PATENT DOCUMENTS

| | | | |
|---|---|---|---|
| 5,729,310 A * | 3/1998 | Horiuchi | G02B 6/0083 349/58 |
| 6,514,460 B1 * | 2/2003 | Fendrock | A61B 5/14532 250/461.1 |
| 2015/0070934 A1 * | 3/2015 | Chou | G02B 6/0051 362/613 |

* cited by examiner

*Primary Examiner* — Bao Q Truong
(74) *Attorney, Agent, or Firm* — Andrew C. Cheng

(57) ABSTRACT

The present invention provides a backlight module, including a plastic frame, a light guide plate, a reflective sheet, a backlight lamp and an optical film, wherein the light guide plate and the optical film are sequentially overlapped and disposed on the reflective sheet; the plastic frame surrounds the light guide plate and the optical film, and a peripheral edge of the plastic frame is provided and received with the backlight lamp; the backlight module also includes a quantum dot film; an inner circumferential surface of the plastic frame is provided with a green compensation layer; the backlight lamp is located between a light incident surface of the light guide plate and the plastic frame; the quantum dot film is overlapped on the light guide plate, and is located between the light guide plate and the optical film. A display panel is also disclosed.

8 Claims, 2 Drawing Sheets

(52) U.S. Cl.
CPC ......... *G02B 6/0073* (2013.01); *G02B 6/0091* (2013.01); *G02F 1/133621* (2013.01); *G02F 2001/133614* (2013.01); *G02F 2202/36* (2013.01)

(58) Field of Classification Search
CPC ... G02F 1/133621; G02F 2001/133614; G02F 2202/36; G02F 1/133617; G02F 1/133615; G02F 1/133609; G02F 1/133308; F21V 9/30; F21V 9/32; F21V 15/01
See application file for complete search history.

BACKLIGHT MODULE AND DISPLAY DEVICE

CROSS REFERENCE

The claims of this application have submitted to the State Intellectual Property Office of the People's Republic of China (SIPO) on May 10, 2016, Application No. 201610304390.0. The priority right based on the China application has a title of "Backlight module and display device". The entire contents of the above-mentioned patent application will be incorporated in the present application through citing.

FIELD OF THE INVENTION

The present invention relates to a liquid crystal display technology field, and more particularly to backlight module and display device.

BACKGROUND OF THE INVENTION

A Liquid Crystal Display (LCD) has many advantages of thin body, low power consumption, no radiation and son on such that the LCD is widely applied in a mobile telephone, a personal digital assistant (PDA), a digital camera, a laptop computer screen. The LCD in the current market is mainly a backlight type LCD, which includes a frame, a liquid crystal display panel disposed inside the frame and a backlight module inside the frame.

A hot technology in the current market is using a quantum dot to improve the gamut of the backlight. The quantum dot is a nanomaterial with quasi zero dimension, and is formed by a small number of atoms; the particle size is generally ranged from 1 nm to 10 nm. Because electrons and holes are limited by quantum, the continuous band structure becomes discrete band structure. After excited, a florescent light is emitted in order to change the gamut of an incident light. The quantum dot backlight technology can increase the gamut of a display device up to 100%. The conventional quantum dot backlight technology mainly has two types. One is to discretely coat the quantum dots on a polyester film in order to replace a diffusion film. The other is packaging the quantum dot into a glass tube, and placing the glass tube between a blue LED and a light guide plate. However, the quantum dot thin film is easily to be affected by the external condition as water and oxygen, and when cutting the edge of the thin film, some water and oxygen will penetrate so that an edge failure problem is generated. The main reason is that the particle size of a green quantum dot is smaller than the particle size of a red quantum dot, and a surface energy is high so that the green quantum dot is easily to react with water and oxygen so as to be fail. Therefore, the failure region presents a fuchsia color.

SUMMARY OF THE INVENTION

The technology problem solved by the present invention is to provide a backlight module and a display device in order to avoid the display abnormal problems caused by the edge failure problem of the quantum dot film.

In order to achieve the above purpose, a technology solution provided by the present invention is: a backlight module, comprising a plastic frame, a light guide plate, a reflective sheet, a backlight lamp and an optical film, wherein the light guide plate and the optical film are sequentially overlapped and disposed on the reflective sheet; the plastic frame surrounds the light guide plate and the optical film, and a peripheral edge of the plastic frame is provided and received with the backlight lamp; the backlight module also includes a quantum dot film; an inner circumferential surface of the plastic frame is provided with a green compensation layer; the backlight lamp is located between a light incident surface of the light guide plate and the plastic frame; the quantum dot film is overlapped on the light guide plate, and is located between the light guide plate and the optical film Wherein, the backlight lamp includes a circuit board and a blue LED, the blue LED is installed on the circuit board and faced toward the light incident surface.

Wherein, a material of the plastic frame is green polycarbonate (PC), and a material of the green compensation layer is the same as the plastic frame and the green compensation layer and the plastic frame are formed integrally.

Wherein, the green compensation layer is adhered to or coated on the inner circumferential surface of the plastic frame, or the green compensation layer is doped inside the plastic frame to be integrally formed with the plastic frame; a material of the green compensation layer is green polyethylene terephthalate (PET), green polyimide (PI) or green phosphor.

Wherein, the light guide plate further includes a light-emitting surface and a bottom surface, the light-incident surface is connected with the light-emitting surface and the bottom surface, and the bottom surface is provided with dots.

The present invention also provides a display device, comprising a liquid crystal display module and a backlight module, and the backlight module comprises: a plastic frame, a light guide plate, a reflective sheet, a backlight lamp and an optical film, wherein the light guide plate and the optical film are sequentially overlapped and disposed on the reflective sheet; the plastic frame surrounds the light guide plate and the optical film, and a peripheral edge of the plastic frame is provided and received with the backlight lamp; the backlight module also includes a quantum dot film; an inner circumferential surface of the plastic frame is provided with a green compensation layer; the backlight lamp is located between a light incident surface of the light guide plate and the plastic frame; the quantum dot film is overlapped on the light guide plate, and is located between the light guide plate and the optical film.

Wherein, the backlight lamp includes a circuit board and a blue LED, the blue LED is installed on the circuit board and faced toward the light incident surface.

Wherein, a material of the plastic frame is green polycarbonate (PC), the green compensation layer is the inner circumferential surface of the plastic frame or the plastic frame itself.

Wherein, the green compensation layer is adhered to or coated on the inner circumferential surface of the plastic frame, or the green compensation layer is doped inside the plastic frame to be integrally formed with the plastic frame; a material of the green compensation layer is green polyethylene terephthalate (PET), green polyimide (PI) or green phosphor.

Wherein, the light guide plate further includes a light-emitting surface and a bottom surface, the light-incident surface is connected with the light-emitting surface and the bottom surface, and the bottom surface is provided with dots.

In the present invention, a green light reflected by the plastic frame of the backlight module will compensate and increase certain brightness at the edge of the backlight module in order to solve the display abnormal problems caused by the edge failure problem of the quantum dot film. The technology problem solved by the present invention is to provide a backlight module and a display device in order to avoid the display abnormal problems caused by the edge failure problem of the quantum dot film.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail.

Figure 1:
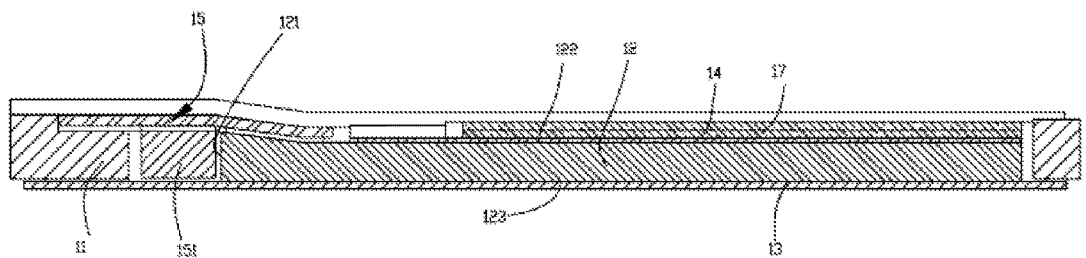
FIG. 1 is a cross-sectional view of a backlight module in a preferred embodiment of the present invention.
Figure 2:
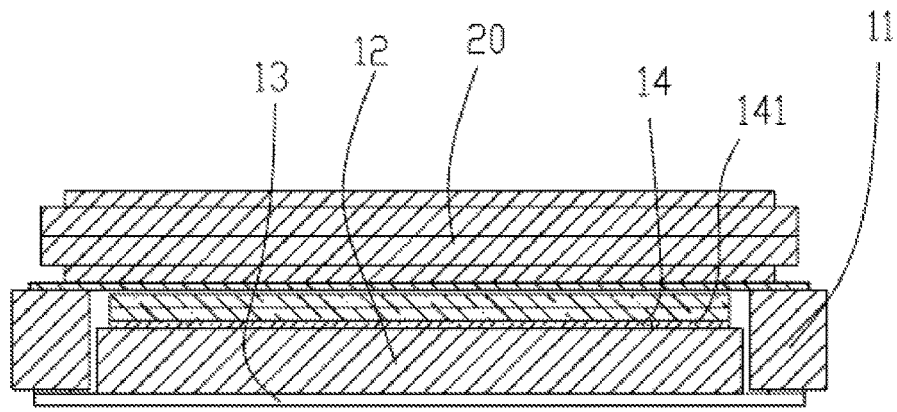
FIG. 2 is a cross-sectional view of a backlight module from another aspect in a preferred embodiment of the present invention.

With reference to FIG. 1 and FIG. 2, a preferred embodiment of the present invention provides a backlight module, including a plastic frame 11, a light guide plate 12, a reflective sheet 13, a backlight lamp 15 and an optical film 17. The light guide plate 12 and the optical film 17 are sequentially overlapped and disposed on the reflective sheet 13. The plastic frame 11 surrounds the light guide plate 12 and the optical film 17, and a peripheral edge of the plastic frame 11 is provided and received with the backlight lamp. The backlight module also includes a quantum dot film 14. An inner circumferential surface of the plastic frame 11 is provided with a green compensation layer (not shown in the figure). The backlight lamp 15 is located between a light incident surface 121 of the light guide plate 12 and the plastic frame 11. The quantum dot film 14 is overlapped on the light guide plate 12, and is located between the light guide plate 12 and the optical film 17. The optical film 17, the quantum dot film 14, the light guide plate 12 and the reflective sheet 13 are sequentially overlapped and disposed.

In the present embodiment, the plastic frame 11 is a rectangular frame, and including a first side surface and a second side surface. The second side surface is fixed to a peripheral edge of the reflective sheet 13 through adhering. The reflective sheet 13 is used for reflecting back the light emitted from a back of the light guide plate to the light guide plate so as to increase the light utilization rate.

In the present embodiment, a material of the plastic frame 11 is green polycarbonate (PC) such that the entire plastic frame is green. A material of the green compensation layer is green polycarbonate (PC) and is integrally formed with the plastic frame 11. It can be understood that the green compensation layer is the inner circumferential surface of the plastic frame 11. With the above structure, only requiring directly forming the plastic frame, which can simplify the structure of backlight module such that the process is simple, saving the process and a precision of the green compensation layer can be ensured. In another embodiment, the green compensation layer is adhered to or coated on the inner circumferential surface of the plastic frame or the green compensation layer is doped inside the plastic frame to be integrally formed with the plastic frame. A material of the green compensation layer is green polyethylene terephthalate (PET), green polyimide (PI) or green phosphor.

In the present embodiment, the light guide plate 12 further includes a light-emitting surface 122 and a bottom surface 123. The light-incident surface 121 is connected with the light-emitting surface 122 and the bottom surface 123. The bottom surface 123 is provided with dots in order to enhance a light-guiding effect of the light guide plate 12. The quantum dot film 14 is overlapped on the light- emitting surface 122.

In the present embodiment, the backlight lamp 15 includes a circuit board and a blue LED 151. The blue LED 151 is installed on the circuit board and faced toward the light incident surface 121. A portion of the quantum dot film 14 located at the periphery of plastic frame 11 will be penetrated by water or oxygen because of cutting such that an edge failure problem of a peripheral region will be generated. Because the backlight module of the present application adopts the green plastic frame 11, after the plastic frame 11 is illuminated by the blue LED 151 and a reflective green light will compensate and increase certain brightness at the edge of the backlight module. That is, the green light reflective by the plastic frame 11, the blue light of the blue LED and a red light generated at the quantum dot film 14 located at a the periphery of the plastic frame 11 having the edge failure problem are mixed as a white light such that a color of the edge failure region of the quantum dot film 14 is changed from a fuchsia color to a white color consistent with a normal region in order to solve the display abnormal problems caused by the edge failure problem of the quantum dot film 14.

Figure 3:
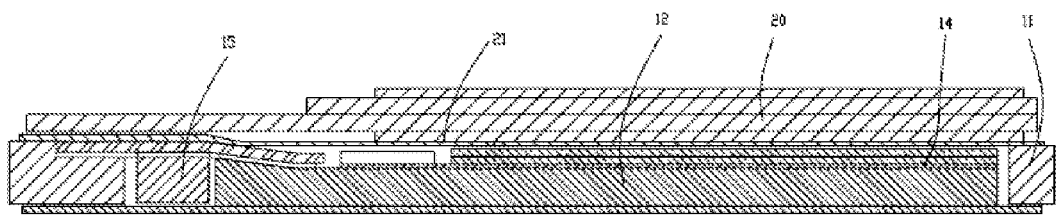
FIG. 3 is a cross-sectional view of a display device having a backlight module of the present invention.

With reference to FIG. 3, and the present invention is also related to a display device. The display device includes a backlight module and a liquid crystal panel 20. The liquid crystal panel 20 is installed above the optical film 17, and is fixed through a double-side adhesive 21. A green light reflected by the plastic frame 11 of the backlight module will compensate and increase certain brightness at the edge of the backlight module in order to solve the display abnormal problems caused by the edge failure problem of the quantum dot film 14.

The above embodiment does not constitute a limitation of the scope of protection of the present technology solution. Any modifications, equivalent replacements and improvements based on the spirit and principles of the above embodiments should also be included in the protection scope of the present technology solution.

What is claimed is:

1. A backlight module, comprising a plastic frame, a light guide plate, a reflective sheet, a backlight lamp and an optical film, wherein the light guide plate and the optical film are sequentially overlapped and disposed on the reflective sheet; the plastic frame surrounds the light guide plate and the optical film, and a peripheral edge of the plastic frame is provided and received with the backlight lamp; the backlight module also includes a quantum dot film; the backlight lamp is located between a light incident surface of the light guide plate and the plastic frame; the quantum dot film is overlapped on the light guide plate, and is located between the light guide plate and the optical film;

wherein the backlight lamp includes a circuit board and a blue LED, the blue LED is installed on the circuit board and faced toward the light incident surface, and the blue LED provides with a blue light;

wherein the plastic frame is green to provide with a reflective green light after being illuminated by the blue LED; and wherein the reflective green light provided by the plastic frame and the blue light provided by the blue LED are mixed at an edge of the quantum dot film to generate a white light at the edge of the quantum dot film.

2. The backlight module according to claim 1, wherein, a material of the plastic frame is green polycarbonate (PC), and a material of the green compensation layer is the same as the plastic frame and the green compensation layer and the plastic frame are formed integrally.

3. The backlight module according to claim 1, wherein, the green compensation layer is adhered to or coated on the inner circumferential surface of the plastic frame, or the green compensation layer is doped inside the plastic frame to be integrally formed with the plastic frame; a material of the green compensation layer is green polyethylene terephthalate (PET), green polyimide (PI) or green phosphor.

4. The backlight module according to claim 1, wherein, the light guide plate further includes a light-emitting surface and a bottom surface, the light-incident surface is connected with the light-emitting surface and the bottom surface.

5. A display device comprising a liquid crystal display module and a backlight module, and the backlight module comprises: a plastic frame, a light guide plate, a reflective sheet, a backlight lamp and an optical film, wherein the light guide plate and the optical film are sequentially overlapped and disposed on the reflective sheet; the plastic frame surrounds the light guide plate and the optical film, and a peripheral edge of the plastic frame is provided and received with the backlight lamp; the backlight module also includes a quantum dot film; the backlight lamp is located between a light incident surface of the light guide plate and the plastic frame; the quantum dot film is overlapped on the light guide plate, and is located between the light guide plate and the optical film;

wherein the backlight lamp includes a circuit board and a blue LED, the blue LED is installed on the circuit board and faced toward the light incident surface, and the blue LED provides with a blue light;

wherein the plastic frame is green to provide with a reflective green light after being illuminated by the blue LED; and wherein the reflective green light provided by the plastic frame and the blue light provided by the blue LED are mixed at an edge of the quantum dot film to generate a white light at the edge of the quantum dot film.

6. The display device according to claim 5, wherein, a material of the plastic frame is green polycarbonate (PC), the green compensation layer is the inner circumferential surface of the plastic frame or the plastic frame itself.

7. The display device according to claim 5, wherein, the green compensation layer is adhered to or coated on the inner circumferential surface of the plastic frame, or the green compensation layer is doped inside the plastic frame to be integrally formed with the plastic frame; a material of the green compensation layer is green polyethylene terephthalate (PET), green polyimide (PI) or green phosphor.

8. The display device according to claim 5, wherein, the light guide plate further includes a light-emitting surface and a bottom surface, the light-incident surface is connected with the light-emitting surface and the bottom surface.

* * * * *